United States Patent
Bi et al.

(10) Patent No.: US 7,822,252 B2
(45) Date of Patent: Oct. 26, 2010

(54) METHOD OF MULTIPLE INSTANCE LEARNING AND CLASSIFICATION WITH CORRELATIONS IN OBJECT DETECTION

(75) Inventors: Jinbo Bi, Chester Springs, PA (US); Jianming Liang, Chester Springs, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 63 days.

(21) Appl. No.: 11/944,827

(22) Filed: Nov. 26, 2007

(65) Prior Publication Data

US 2008/0125648 A1     May 29, 2008

Related U.S. Application Data

(60) Provisional application No. 60/867,442, filed on Nov. 28, 2006.

(51) Int. Cl.
*A61B 6/03*     (2006.01)
*G01N 23/083*   (2006.01)

(52) U.S. Cl. .................... 382/130; 378/4; 382/154; 600/410; 600/425

(58) Field of Classification Search ............... 600/425; 382/130, 154
See application file for complete search history.

(56) References Cited

U.S. PATENT DOCUMENTS

| 2004/0066966 A1* | 4/2004 | Schneiderman ............ 382/159 |
| 2005/0141765 A1* | 6/2005 | Liang et al. ................. 382/181 |
| 2006/0251324 A1* | 11/2006 | Bachmann et al. .......... 382/173 |

* cited by examiner

*Primary Examiner*—Vu Le
*Assistant Examiner*—Michael Vanchy, Jr.
(74) *Attorney, Agent, or Firm*—Joshua Ryan

(57) ABSTRACT

A method for detecting an object within a structure includes performing tobogganing on image data to obtain one or more voxel clusters and to provide a rough indication of the structure. Each of the obtained voxel clusters is characterized as an object candidate and a set of features are determined for each object candidate. Correlations between pairs of the object candidates are measured. Each of the object candidates is classified as either a true object or a non-object based on the set of features and the measured correlations.

20 Claims, 3 Drawing Sheets

METHOD OF MULTIPLE INSTANCE LEARNING AND CLASSIFICATION WITH CORRELATIONS IN OBJECT DETECTION

CROSS-REFERENCE TO RELATED APPLICATION

The present application is based on provisional application Ser. No. 60/867,442, filed Nov. 28, 2006, the entire contents of which are herein incorporated by reference.

BACKGROUND OF THE INVENTION

1. Technical Field

The present disclosure relates to object detection and, more specifically, to a method of multiple instance learning and classification with correlation in object detection.

2. Discussion of the Related Art

A pulmonary embolism (PE) is a blockage, for example a clot, within the arteries that carry blood from the heart to the lungs. The presence of PEs may be detected with the use of pulmonary angiography. Pulmonary angiography may involve catheterization of the right atrium of the heart and injection of radiocontrast into the right heart.

Less invasive approaches for the detection of pulmonary embolism have been developed. For example, CT imaging may be used to provide CT pulmonary angiography (CTPA) without the need for injecting radiocontrast directly into the heart. In these approaches, a computer tomography (CT) scanner is used to image the vessel tree and pulmonary arteries of the lungs.

Detection of PEs within the CT images may be performed either manually or automatically. In manual PE detection, a trained medical practitioner, for example a radiologist, manually reviews the CT data to locate evidence of a PE. This practice may be particularly time consuming and tedious as modern CT images contain a vast amount of data.

Moreover, manual reading of the CT image data may be further complicated by various image abnormalities that may look like a PE and may thus lead to a false positive. Examples of such image abnormalities include respiratory motion artifacts, flow-related artifacts, streak artifacts, partial volume artifacts, stair step artifacts, lymph nodes, and vascular bifurcation, among many others.

Upon diagnosis of a PE, an extended course of anti-clotting medications are administered. These medications may lead to bleeding so it is important that misdiagnosis of a false-positive be minimized.

In automatic PE detection, the CT data is analyzed by a computer to detect either a PE or to select regions of suspicion that may be brought to the attention of the radiologist. The radiologist may then pay particular attention to the selected regions of suspicion. Accordingly, automatic PE detection may reduce the amount of time necessary to review CT data for evidence of a PE and may increase accuracy of detection by bringing regions of suspicion, which may have otherwise gone unnoticed, to the attention of the radiologist.

In conventional approaches to CTPA, the patient is scanned with a CT scanner and the CT data is combined to form a 3-dimensional volume image of the patient's chest. Next, the pulmonary arteries and related vessel tree are segmented. In segmentation, the computer makes a determination as to which image voxels are part of the vessel tree and which image voxels are not part of the vessel tree. This determination may be based on many factors, for example, the voxel intensity gradient.

Once the vessel tree has been segmented, the computer may examine the vessel tree for evidence of PE. Regions showing evidence of PE may then be characterized as regions of interest and may be brought to the attention of the radiologist.

However, segmentation of the vessel tree may be particularly expensive in terms of time and computational resources. This is because the vessel tree structure is complex and because modern CT images are of a very high resolution giving rise to an enormous number of image voxels.

SUMMARY

A method for detecting an object within a structure includes performing tobogganing on image data to obtain one or more voxel clusters and to provide a rough indication of the structure. Each of the obtained voxel clusters is characterized as an object candidate and a set of features are determined for each object candidate. Correlations between pairs of the object candidates are measured. Each of the object candidates is classified as either a true object or a non-object based on the set of features and the measured correlations.

The classifying of each of the object candidates may be performed by a multiple instance classifier. The classifier may be trained with multiple instance learning. The classifying may be performed by a multiple instance classifier with correlations.

The features may include a texture feature, an intensity feature, a vesselness feature, or a vein/artery feature. The measured correlations between the pairs of the object candidates may be spatial relations between the pairs of the object candidates. The may be geodesic distances along the rough indication of the structure.

An object cluster may be associated with one or more object candidates and the object cluster may be considered detected when at least one of the associated candidates of the object cluster are classified.

A search field may be defined within the image data that includes the structure without segmenting the structure and the performance of tobogganing of the image data may be limited to within the defined search field.

The object being detected may be a pulmonary embolism and the vascular structure may include pulmonary arteries, a related vessel tree or both pulmonary arteries and the related vessel tree.

The image data may be CT image data acquired from a CT scanner or MR image data acquired from an MRI.

The search field may be a region including lungs.

Performing tobogganing on the image data may include performing a non-recursive sliding of each voxel satisfying sliding criteria in the direction of an adjacent voxel selected according to the sliding criteria.

The object candidates may be pulmonary embolism candidates. Each of the object candidates may be classified according to the features using a learning model that has used training data to learn to differentiate object candidates based on the features. Classification of the object candidates according to the features may be refined based on the correlations between pairs of the object candidates.

The object candidates classified as true objects may be presented to a human user. Confirmation data of the presented true objects may be received from the human user. The received confirmation data may be used to improve the learning model.

A system for detecting a pulmonary embolism (PE) within a vascular structure includes a voxel shifter for performing tobogganing on a medical image to obtain one or more PE candidates and to provide a rough indication of the vascular structure. The vascular structure is not segmented from the medical image prior to performing tobogganing. A determining unit determines a set of features for each PE candidate. A measuring unit measures geodesic distance along the rough indication of the vascular structure between each of the PE candidates. A classifier unit classifies each of the PE candidates as either a true PE or a non-PE based on the sets of features for each PE candidate and the measured geodesic distances. A display unit displays the true PEs to a medical practitioner by highlighting the corresponding regions on the CT image data.

A cluster may be associated with one or more PE candidates and each of the associated PE candidates of the cluster may be considered identified after at least one of the PE candidates of the cluster are classified.

A search field may be defined within the medical image, without first segmenting the vascular structure, including a lung area and limiting the performance of tobogganing to the search field.

The voxel shifter may perform tobogganing on the image data by performing a non-recursive sliding of each voxel satisfying sliding criteria in the direction of an adjacent voxel selected according to the sliding criteria.

The classifier unit may classify according to the features using a learning model that has used training data to learn to differentiate object candidates based on the features.

Classification of the object candidates according to the features may be refined based on features of spatially related object candidates, as determined by the geodesic distances.

A computer system includes a processor and a program storage device readable by the computer system, embodying a program of instructions executable by the processor to perform method steps for includes performing tobogganing on image data to obtain one or more voxel clusters and to provide a rough indication of the structure. Each of the obtained voxel clusters is characterized as an object candidate and a set of features are determined for each object candidate. Correlations between pairs of the object candidates are measured. Each of the object candidates is classified as either a true object or a non-object based on the set of features and the measured correlations.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
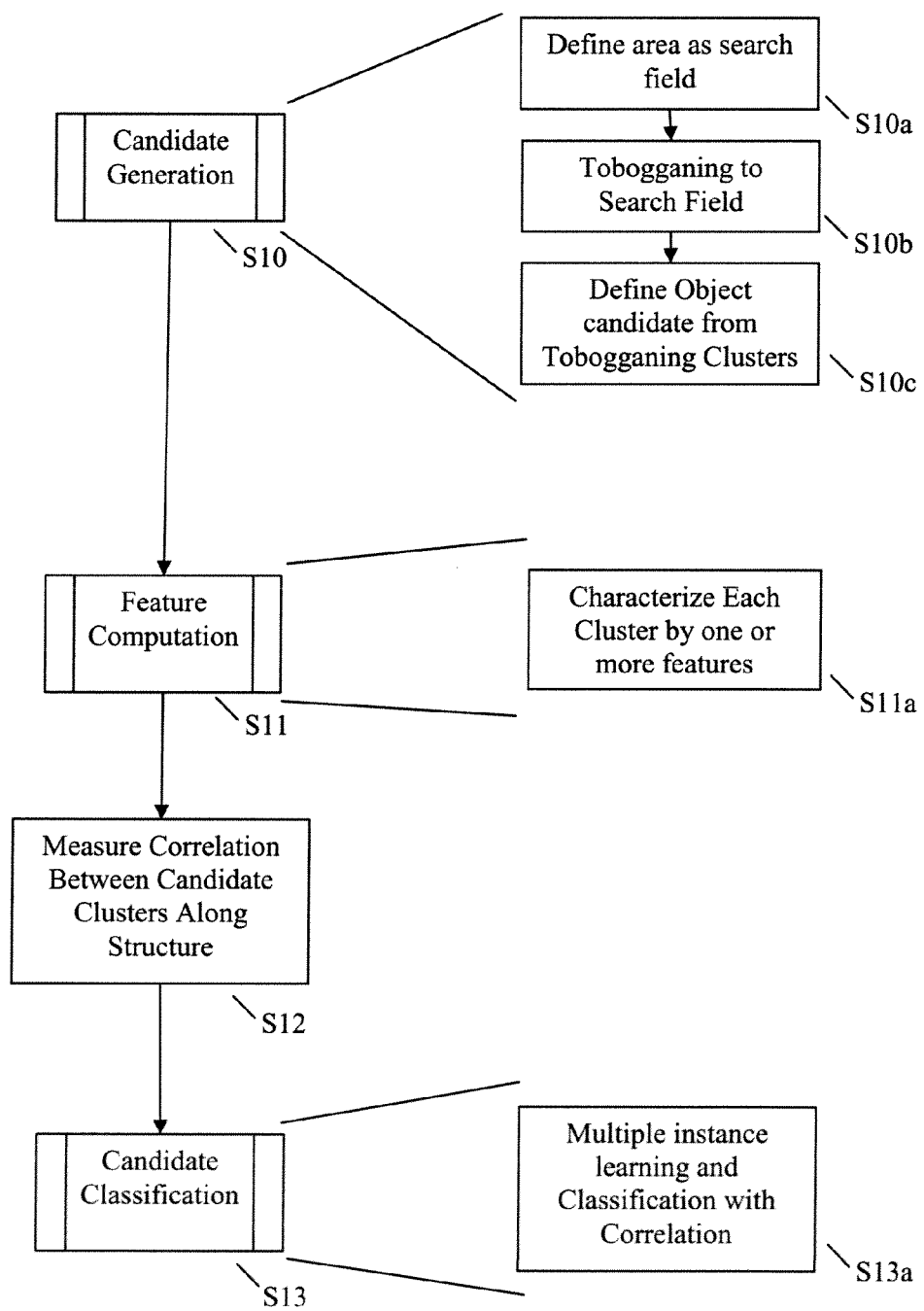
FIG. 1 is a flow chart illustrating a method for identifying an object according to an exemplary embodiment of the present invention.

In describing the exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention provide methods and systems for automatically detecting objects, for example obstructions such as embolisms in the pulmonary arteries and/or related vessel tree of a patient. Embodiments may be described herein in terms of identification of pulmonary embolisms (PEs) however, it is to be understood that the methods and systems herein described may be easily applied, more generally, to other objects.

Exemplary embodiments of the present invention may identify object candidates from within image data, for example, a medical image such as a computed tomography (CT) image, a magnetic resonance image (MR), a positron emission tomography (PET) image, a sonogram image, or any other medical or non-medical image, without the need to first perform segmentation, for example, segmentation of the vessel tree. By avoiding this computationally expensive and time consuming step, exemplary embodiments may identify object candidates more quickly and with less expense than traditional approaches. By saving time and computational expense, automatic object detection techniques may be more widely adopted and utilized on a timelier basis thereby reducing patient morbidity and mortality.

FIG. 1 is a flow chart illustrating a method for identifying an object, for example, a PE, according to an exemplary embodiment of the present invention. The first step may be candidate generation (Step S10). In this step, suspicious regions may be quickly identified. Each suspicious region, referred to as an object candidate, may correspond to a cluster of image voxels. The next step may be feature computation (Step S11). In this step, a set of descriptive features are gathered from each object candidate. In the next step, correlation between candidate clusters are measured (Step S12). In the final step, the features of each object candidate are compared so that object candidates may be classified as either a true object or a non-object (i.e. something other than the object to be identified). Thus, the fourth step is candidate classification (Step S13). Candidate classification may be based on multiple instance learning, where it is not necessary that each candidate of a prospective object be classified and it is sufficient that one or more object candidates be classified.

As described above, conventional approaches to automatic detection of objects in CT image volumes require vessel segmentation as a first step. It is then only after the vessels have been segmented that PE candidates are identified. By segmenting the vessels, the search for PEs is limited to within the vessel tree. In addition to this approach being computationally expensive and time consuming, it is also prone to error some of the vessel tree may not be correctly segmented and thus a potential PE may be located outside the search space.

In object candidate generation according to exemplary embodiments of the present invention, for example, as applied to the generation of PE candidates, the entire lung volume may be within the search space thereby reducing the possibility that a PE is located beyond the search space and avoiding the time and processing constraints of vessel tree segmentation. Accordingly, an area is defined as the search field (Step S10a). In this example, the lung region may be defined as the search field.

A "tobogganing" approach may then be performed on the search field (Step S10b). According to this approach, each image voxel meeting predetermined sliding criteria is slid in a particular direction as determined by the criteria. U.S. patent application Ser. No. 11/247,609, filed Oct. 11, 2005, which is hereby incorporated by reference in its entirety, describes exemplary approaches for performing tobogganing.

In tobogganing, which takes its name from the processing analogy of sliding down a steep hill, a voxel v with an intensity value P(v) and neighbors N(v) slide down to the voxel v̂: v̂=arg min$_{t \in N(v) \cup \{v\}}$P(t). When multiple voxels in the neighborhood of a voxel achieve the same minimal intensity, the first voxel met may be chosen. A voxel that cannot slide to any of its neighbors is called a concentration. The voxels sliding down to the same concentration may form a toboggan cluster with a unique label.

The tobogganing approach may start from a specified location and quickly form a toboggan cluster locally without involving any voxels beyond the outer boundary of the toboggan cluster. Each voxel need only be processed once, and thus the process is non-recursive. Accordingly, the process may be highly efficient. At the completion of tobogganing, the toboggan clusters in the search field may be collected to form an object candidate, from which a single detection position may be derived based on morphological ultimate erosion (Step S10c).

With respect to the identification of PEs, the tobogganing algorithm may be further accelerated based on the following a priori knowledge of medical physics. In CTPA images, the PE may appear as a dark regions with Hounsfield Units (HU) between −50 HU and 100 HU. Therefore, the voxels outside the range [−50 HU, 100 HU] may be effectively excluded and sliding may be limited to the voxels inside the HU range to accelerate the tobogganing process.

Accordingly, a fast and coarse overall lung segmentation may be used as a PE search region, bounded by the outer pleural surface, instead of an arterial segmentation.

Moreover, when only a coarse lung mask is used, partial volume artifacts around the vessel wall and around the airway wall may be properly handled, as the voxels in those areas may have original CT values similar to those in the PE regions. As a result of the tobogganing process, almost all of the voxels automatically merge into regions outside of the PE search region (below −50 HU), and are therefore automatically removed when collecting toboggan clusters.

For each candidate, a set of image-based features may be computed and may be normalized to a unit range with a feature specific mean. The features can be categorized into those that are indicative of voxel intensity distributions within the candidate, those summarizing distributions in neighborhood of the candidate, and those that describe the 3-D shape of the candidate and enclosing structures. When combined, these features can capture candidate properties that can differentiate true object from typical false positives such as dark areas that result from poor mixing of bright contrast agents with blood in veins, and dark connective tissues between vessels. These features may be represented as a vector and each object candidate may have a vector representing its features.

Due to partial volume effects, voxels around the artery boundaries may not have a value below −50 HU and may not have a value above 100 HU. These voxels may be removed without removing the PE voxels. Accordingly, voxels between −50 HU and 100 HU may be slid to a neighbor voxel with a minimal CT value. All voxels that do not slide into regions with Hounsfield Units below −50 HU may be collected as a PE candidate cluster. As a by-product of this tobogganing process, the PE candidate clusters along with the voxels with a CT value above 100 HU may resemble rough vessel segmentation.

Tobogganing need not be limited to the detection of PEs. Tobogganing may be used more generally in any image data to help detect an object of interest. In these situations there may be a priori knowledge pertaining to the object being searched for that may further speed up search.

By using such a tobogganing approach, the image voxels may be clustered for efficient detection of object candidates. Moreover, the tobogganing approach may reveal a reasonable indication of the vessel tree. This indication of the vessel tree is not a conventional segmentation because it may not provide adequate detail to restrict the object search field; however, this indication of the vessel tree may be used to determine information about the relationship of various object candidates along the vessel tree.

It may be assumed that object candidates close to each other along the vessel structure are more likely to share common characteristics than those object candidates that are farther apart. Thus a soft constraint derived by the geodesic distances between the object candidate clusters along the vascular structure may be used to perform feature computation. Accordingly, prediction of expected features for each object candidate may be refined based on the expected features of other object candidates that are in relatively close proximity along the vessel structure.

In the feature computation step (Step S11), features pertaining to each object candidate may be collected and each candidate may be characterized by one or more of the features (Step S11a). These features may include, for example, statistics pertaining to intensity values inside each candidate cluster, intensity values occurring outside of a candidate cluster within a predetermined distance, texture features including the texture of each candidate cluster, vesselness properties including vesselness of the surrounding area of the candidate cluster to determine the extent to which the candidate cluster appears in a vessel, vein/artery properties including features to determine the extent to which the candidate cluster appears to be in a vein or artery, etc. These features may be characterized as a vector for each candidate indicating the collected values for each feature. It is these feature vectors that may be used to develop classifier assumptions and train identification of true object candidates over non-objects.

In the correlation step (Step S12), the correlation between pairs of object candidates may be measured. The correlation may be, for example, a spatial relationship such as the geodesic distance between the pairs. For example, the measurement may be taken between each object candidate along the vascular structure.

Then, candidate classification may be performed (Step S13). In this step, the candidates may be classified as either true objects or non-objects based on the computed features. Additionally, because proximal candidates may be expected to have similar features, the correlation between object candidates may be used to refine feature prediction.

Multiple object candidates, for example, grouped together in a single cluster, may be discovered for each suspected object. This is because the process of limiting one object candidate per suspected object may result in the missing of any object candidates for a particular suspected object. Accordingly, it may not be necessary to classify each object candidate for a particular cluster. It may be enough that one or more object candidates be classified. Classifying the cluster based on a subset of object candidates may be performed by multiple instance learning and classification with correlation (Step S13a).

For clinical acceptability, the rate of false positives may be controlled and as many true PEs as possible may be detected. A PE can be large, or have an elongated shape along the vessel, or split at the vessel bifurcation. Multiple candidate clusters may exist to intersect with single PE. As long as one of the candidates is identified and visualized to physicians, the entire PE can be easily traced out. Consequently, it may be sufficient to detect one candidate for each PE. Correct classification of every candidate instance is not as important as the ability to detect at least one candidate that points to a specific PE. Based on this concept, a novel approach called multiple instance learning and classification with correlation is used to reduce false positives. Thus, an object cluster may be associated with one or more candidates, and each of the associated candidates of the object cluster may be considered identified after at least one of the candidates has been classified correctly.

Accordingly, time may be saved by considering subsequent object candidates in a given cluster as already classified after one or more such object candidates of the cluster have been classified.

As described above, correlations, for example, geodesic distances, may also contribute to this classification, for example, by incorporating the knowledge that highly correlated candidates are expected to have similar features. Thus the features of one candidate may influence the feature assumptions for neighboring candidates.

These techniques may be used in conjunction with an existing classification formulation, for example, the Fisher linear discrimination analysis and classic support vector machines (SVM).

Classification based on the feature vectors may be performed with a learning model that has been taught how to identify the difference between true objects and non-objects based the feature vectors. Examples of suitable learning models are described below.

In one exemplary embodiment for establishing training for classifying true PEs based on the geodesic distances, a 1-norm SVM model is used to classify based on the geodesic distances. While other approaches may be used, the 1-norm SVM model may achieve sparse classifiers which may reduce the number of features for model capacity and control time and efficiency.

According to this approach, it may be assumed that there are a total of l candidates $(x_i, y_i)$, $i=1, \ldots, l$ extracted from the n training volumetric images and d image-based features are computed after the candidate generation and feature calculation steps. I+ and I− may represent two index sets containing indices of candidates that intersect with true PEs and do not intersect with true PEs, respectively.

There may be a total of m PEs marked by expert radiologists for n images. $I_j$ may denote the index set of the candidates that intersect with the j-th PE, where $j=1, \ldots, m$. Accordingly, $\cup\{I_j, j=1, \ldots, m\}=I+$. Any given two index sets $I_j$'s are not necessarily disjoint since there may exist a candidate cluster that intersects with more than one PE.

The vector $x_i$ may include each of the feature values computed for the i-th candidate, and $y_i$ may be a label manually obtained by expert radiologists.

The regular 1-norm SVM may then construct a hyperplane classifier as sign($w^T x + b$) by optimizing the following problem:

$$\min_{w,\xi} \gamma \|w\|_1 + \sum_{i \in I+} \xi_i + \sum_{i \in I-} \xi_i \quad (1)$$
$$\text{s.t. } w^T x_i + b \geq 1 - \xi_i, i \in I+,$$
$$w^T x_i + b \leq -1 + \xi_i, i \in I-, \xi_i \geq 0, i = 1, \ldots, l.$$

where $\gamma$ is the regularization parameter that controls the trade-off between the regularization factor $\|w\|_1$ and the error term. A candidate (represented by a vector x) may be classified correctly when $\xi=0$, or otherwise a positive $\xi$ defines the hinge loss of the candidate.

Once a candidate in $I_j$ is classified as a positive, then the j-th PE may be considered identified. This consideration may motivate the resulting classifier to focus on different PEs instead of multiple candidates within a single PE. This technique may help to reduce false positives by potentially ignoring extremely noisy candidates that intersect with some PEs where, for the same PE, other associated candidates may then be classified correctly.

Mathematically, distinguishing may be equivalent to requiring the minimum of the errors ($\xi$) that occur on the candidates associated with a PE to be 0. For example, if a PE is associated with 3 candidates, and a classifier generates $\xi_1=0$ for the first candidate, $\xi_2=5$, $\xi_3=100$ for the other two candidates, the classifier has detected the PE. Accordingly, this may imply that the classifier may be constructed by solving the following optimization problem:

$$\min_{w,\xi} \gamma \|w\|_1 + \sum_{j=1}^{m} \min\{\xi_i, i \in I_j\} + \sum_{i \in I-} \xi_i \quad (2)$$
$$\text{s.t. } w^T x_i + b \geq 1 - \xi_i, i \in I+,$$
$$w^T x_i + b \leq -1 + \xi_i, i \in I-, \xi_i \geq 0, i = 1, \ldots, l.$$

This optimization problem may be substituted with a substantially equivalent optimization problem that may be computationally easier to solve:

$$\min_{w,\xi,\lambda} \gamma \|w\|_1 + \sum_{j=1}^{m} \left( \sum_{i \in I_j} \lambda_i \xi_i \right) + \sum_{i \in I-} \xi_i \quad (3)$$
$$\text{s.t. } w^T x_i + b \geq 1 - \xi_i, i \in I+, w^T x_i + b \leq -1 + \xi_i, i \in I-,$$
$$\xi_i \geq 0, i = 1, \ldots, l, \sum_{i \in I_j} \lambda_i = 1, \lambda_i \geq 0, i \in I_j, j = 1, \ldots, m.$$

Accordingly, the geodesic distance from one PE candidate to another PE candidate along the vessel may be approximated, for example, with a modified Dijkstra's algorithm. Dijkstra's algorithm solves the single-source shortest path problem for a graph with nonnegative edge weights.

Because each PE candidate may be a cluster of voxels, the geodesic distance may be computed from a first group of voxels to a second groups of voxels. Accordingly, the graph may be modified by assigning a zero weight to the edges created between any pair of neighboring voxels within the same cluster.

With this modified graph, Dijkstra's algorithm may be used to compute the shortest distance from the boundary of one PE candidate to the boundary of another PE candidate.

For each patient, a geodesic distance map matrix G may thus be created among the candidates. An exemplary geodesic distance map is shown in FIG. 2.

Figure 2:
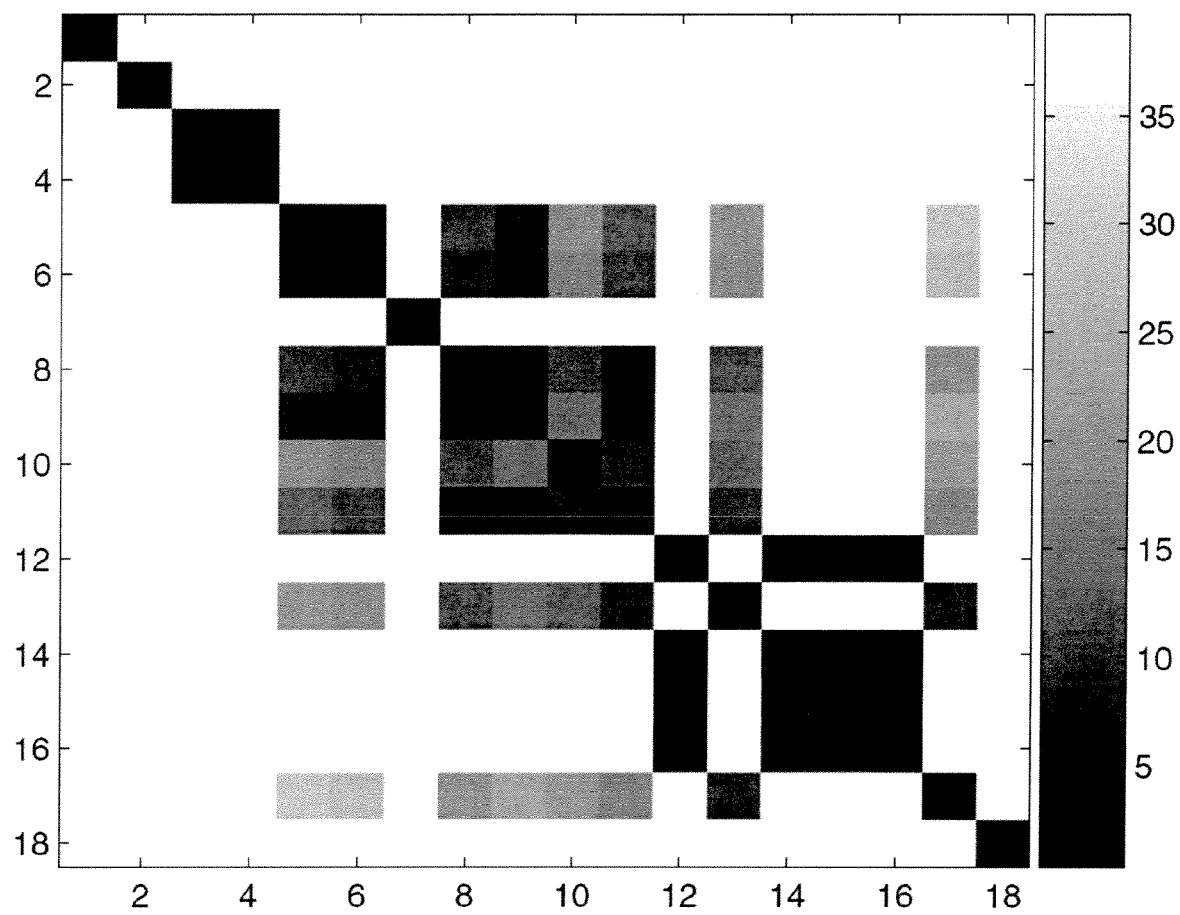
FIG. 2 shows an exemplary correlation map according to an exemplary embodiment of the present invention.

In the exemplary correlation map of FIG. 2, the geodesic distance map G of a patient with 18 candidates is shown. The correlation used here are spatial relationships, and more specifically, geodesic distances, however, it should be understood that other forms of correlation may be used. The major diagonal is completely dark as the geodesic distance from a candidate to itself is zero. The geodesic distance map is always symmetric, as the geodesic distance from a first candidate to a second candidate is the same as from the second candidate to the first candidate.

A white area indicates that there is no shortest path between a pair of candidates (e.g., from a candidate in the pulmonary artery to a candidate in the pulmonary vein, or from a candidate located in the left lung to a candidate in the right lung).

The correlation map is sparse in most cases. In the example shown, the maximum geodesic distance is found between candidate 5 and candidate 17 and is equal to 28.2 mm.

Because of the prevalence of white space indicative of no geodesic link between two candidates along the vessel structure, the resulting similarity matrix of candidates may be sparse. The similarity matrix for each patient may be calculated as $S=\exp(-\alpha G)$ where $\alpha>0$ is a proper scaling parameter.

The learning formulation for determining a true PE may incorporate the similarity matrices (geodesic distance maps). Assuming p is used to index each patient, candidates generated from the p-th patient's image may be expressed as $x_{i_1}, \ldots, x_{i_p}$. A matrix $X_p = [x_{i_1}, \ldots, x_{i_p}]^T$ may represent the candidate set for the patient p where each row represents one candidate from the p-th patient. Then problem (3) may be rewritten as follows:

$$\min_{w,\xi,\lambda} \gamma\|w\|_1 + \sum_{j=1}^{m} \left(\sum_{i \in I_j} \lambda_i \xi_i\right) + \sum_{i \in I_-} \xi_i \quad (4)$$

$$\text{s.t. } Y_p(X_p w + b) \geq 1 - \xi_p, \xi_p \geq 0, p = 1,$$

$$\ldots, n, \sum_{i \in I_j} \lambda_i = 1, \lambda_i \geq 0, i \in I_j, j = 1, \ldots, m.$$

where $Y_p$ is a diagonal matrix with diagonal element equal to the labels of the candidates. Accordingly, y=1 where the corresponding candidate intersects with a PE, or y=−1 otherwise. The variable $\xi_p$ is a vector containing all the hinge losses $\epsilon_i$ occurred on the candidates $x_i$ from patient p.

As described above, the use of correlations between candidates may be used to refine feature expectations because candidates spatially close together along the vessel structure ought to share similar characteristics. Hence, to classify an individual candidate in an image, the classifier may examine the class membership of close-by candidates in the same patient's image. For example, the candidate generator may produce three candidates from a patient's image, $x_1, x_2, x_3$. In predicting the label of the first candidate, the prediction $y_1 = z_1 + s_{12}z_2 + s_{13}z_3$, where $z_i = x_i^T w + b$, $s_{12}$ and $s_{13}$ are the similarity measures based on the geodesic distances, and may determine how similar the first candidate is to the second and the third candidates, respectively.

For example, for patient p, the spatially-related classifier may be written as $y=(\theta S_p + E)(X_p w + b)$ where $S_p$ is the similarity matrix of candidates which may be very sparse as shown in FIG. 2, and E is the identity matrix, and $\theta$ is a tuning parameter that defines how much impact the neighboring candidates will have on a specific candidate.

This model may generate prediction results simultaneously for all candidates by mutually connecting each other with the correlation matrix $\theta S_p + E$.

For example, for images in the training set, candidates with hinge losses, $Y_p(\theta S_p + E)(X_p w + b) \geq 1 - \xi_p$ may be classified. This may be derived from the following optimization problem:

$$\min_{w,\xi,\lambda} \gamma\|w\|_1 + \sum_{j=1}^{m} \left(\sum_{i \in I_j} \lambda_i \xi_i\right) + \sum_{i \in I_-} \xi_i \quad (5)$$

$$\text{s.t. } Y_p(S_p + E)(X_p w + b) \geq 1 - \xi_p, \xi_p \geq 0, p = 1,$$

$$\ldots, n, \sum_{i \in I_j} \lambda_i = 1, \lambda_i \geq 0, i \in I_j, j = 1, \ldots, m.$$

Problem (5) may be used to construct classifiers. The indexing uses notation for index sets ($I_j$) of candidates corresponding to different PEs and index sets (p) of candidates from different patients, the resulting optimization problem is simply a quadratic program, for example, a quadratic objective with linear constraints. The problem is not necessarily convex due to the cross term $\lambda_i \xi_i$ in the objective. This may be optimized using conjugate gradient approaches or by alternating optimization approaches. Note that where $\theta=0$, problem (5) is the same as problem (3) where spatial distance does not take an effect.

After training the classifier with a set of training data including the feature vectors of object candidates and the markings of actual PEs made by radiologists, the classifier, for example, by using one of the techniques discussed above, may be able to accurately distinguish between a true object and a non-object. Thus, a trained classifier may perform the step of classifying each candidate object.

The results of the classification may then be presented to the medical practitioner for review. Each candidate object that has been deemed to be a true object may be brought to the attention of the medical practitioner, for example, using highlighting or other effects. The medical practitioner may subsequently confirm or reject the results of the classifier. This confirmation data may then be feed back to the classifier as additional training data to subsequently improve system accuracy.

As discussed above, the image may be any form of image including medical images and non-medical images. In one example, the image is a CT image. In acquiring the CT image, a CT scanner may be used. The CT image data may be sent from the CT scanner to a database of medical images. A computer application for implementing exemplary embodiments of the present invention may load the CT image data from the CT scanner directly or from the database of medical images. The computer application may then perform the steps of candidate generation, feature computation and candidate classification as described above. The computer application may then provide the medical practitioner with a display of the CT data with the regions found to be true PEs highlighted. The application may then solicit confirmation from the medical practitioner as described above. The application may use acquired conformation data to enhance future candidate classification, for example, according to one of the learning approaches discussed above.

Figure 3:
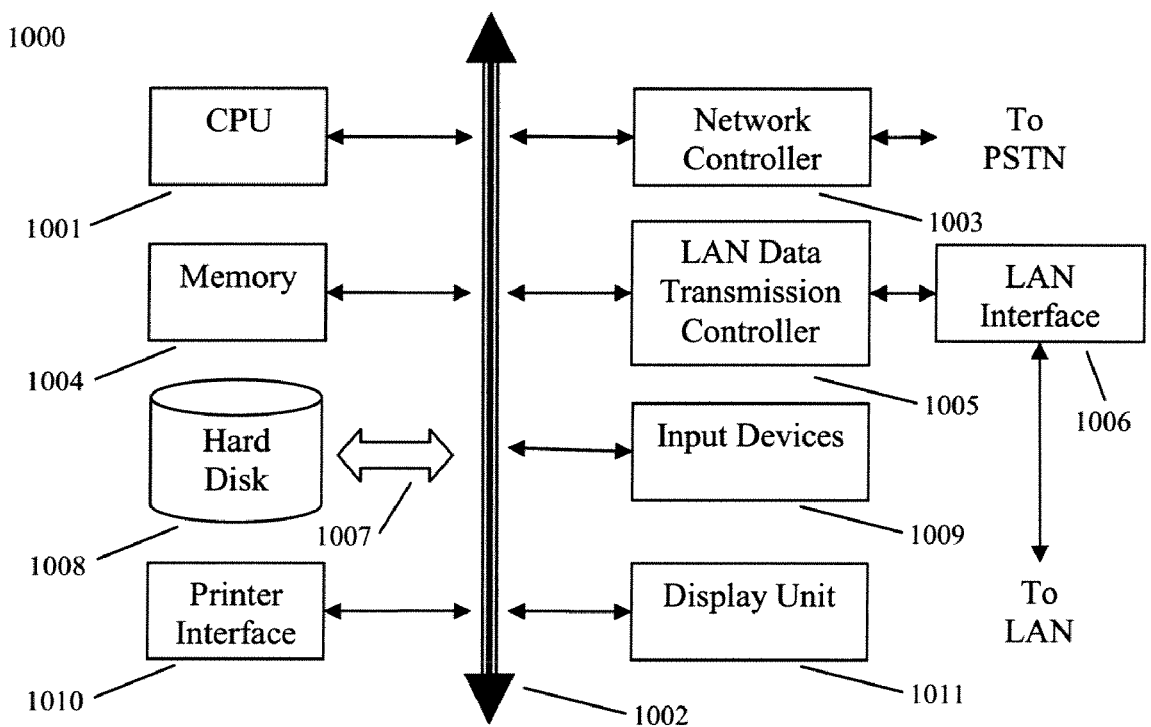
FIG. 3 shows an example of a computer system capable of implementing the method and apparatus according to embodiments of the present disclosure.

FIG. 3 shows an example of a computer system which may implement a method and system of the present disclosure.

The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The above specific exemplary embodiments are illustrative, and many variations can be introduced on these embodiments without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for detecting an object within a structure, using an image processing system, comprising:
    performing tobogganing on image data to obtain one or more voxel clusters and to provide a rough indication of an anatomical structure;
    characterizing each of the obtained voxel clusters as an object candidate;
    measuring geodesic distances between pairs of distinct object candidates along the rough indication of the structure;
    determining a set of features for characterizing the object candidates as either a true object or a non-object using the measured geodesic distances by assuming that distinct object candidates in close proximity, along the rough indication of anatomical structure, exhibit common features; and
    classifying each of the object candidates as either a true object or a non-object using multiple instance learning and the determined set of features.

2. The method of claim 1, wherein multiple instance learning is used to training a classifier that is used to distinguish between the true object and the non-object in combination with the measured geodesic distances.

3. The method of claim 1, wherein the training classifier makes use of a texture feature, an intensity feature, a vesselness feature, or a vein/artery feature in classifying the object classifiers.

4. The method of claim 1, wherein an object cluster is associated with one or more object candidates and the object cluster is considered detected when at least one of the associated candidates of the object cluster are classified.

5. The method of claim 1, additionally comprising defining a search field within the image data that includes the structure without segmenting the structure and limiting the performance of tobogganing of the image data to within the defined search field.

6. The method of claim 1, wherein the object being detected is a pulmonary embolism and the vascular structure includes pulmonary arteries, a related vessel tree or both pulmonary arteries and the related vessel tree.

7. The method of claim 1, wherein the image data is CT image data acquired from a CT scanner or MR image data acquired from an MRI.

8. The method of claim 1, wherein the search field is a region including lungs.

9. The method of claim 1, wherein performing tobogganing on the image data includes performing a non-recursive sliding of each voxel satisfying sliding criteria in the direction of an adjacent voxel selected according to the sliding criteria.

10. The method of claim 1, wherein the object candidates are pulmonary embolism candidates.

11. The method of claim 1, wherein each of the object candidates are classified according to the features using a learning model that has used training data to learn to differentiate object candidates based on the features.

12. The method of claim 11, wherein classification of the object candidates according to the features is refined based on the geodesic distances between pairs of the object candidates.

13. The method of claim 11, additionally comprising:
    presenting the object candidates classified as true objects to a human user;
    receiving confirmation data of the presented true objects from the human user; and
    using the received confirmation data to improve the learning model.

14. A system for detecting a pulmonary embolism (PE) within a vascular structure, comprising:
    a voxel shifter for performing tobogganing on a medical image to obtain one or more PE candidates, and to provide a rough indication of the vascular structure, wherein the vascular structure is not segmented from the medical image prior to performing tobogganing;
    a determining unit for determining a set of features for each PE candidate;
    a measuring unit for measuring geodesic distance along the rough indication of the vascular structure, resulting from the tobogganing, between distinct PE candidates along the rough indication of the vascular structure;
    a refining unit for refining the determined set of features for characterizing the object candidates as either a true object or a non-object using the measured geodesic distances along the rough indication of vascular structure by assuming that distinct object candidates in close proximity exhibit common features;
    a classifier unit for classifying each of the PE candidates as either a true PE or a non-PE based on the refined sets of features for each PE candidate and the measured geodesic distances; and
    a display unit for displaying the true PEs to a medical practitioner by highlighting the corresponding regions on the CT image data.

15. The system of claim 14, wherein a cluster is associated with one or more PE candidates and each of the associated PE candidates of the cluster are considered identified after at least one of the PE candidates of the cluster are classified.

16. The system of claim 14, additionally comprising defining a search field within the medical image, without first segmenting the vascular structure, including a lung area and limiting the performance of tobogganing to the search field.

17. The system of claim 14, wherein the voxel shifter performs tobogganing on the image data by performing a non-recursive sliding of each voxel satisfying sliding criteria in the direction of an adjacent voxel selected according to the sliding criteria.

18. The system of claim 14, wherein the classifier unit classifies according to the features using a learning model that has used training data to learn to differentiate object candidates based on the features.

19. The system of claim 14, wherein classification of the object candidates according to the features is refined based on features of spatially related object candidates, as determined by the geodesic distances.

20. A computer system comprising:
   a processor; and
   a program storage device readable by the computer system, embodying a program of instructions executable by the processor to perform method steps for detecting an object within a structure, the method comprising:
      performing tobogganing on image data to obtain one or more voxel clusters and to provide a rough indication of an anatomical structure;
      characterizing each of the obtained voxel clusters as an object;
      measuring geodesic distances between pairs of distinct object candidates along the rough indication of the structure;
      determining a set of features for characterizing the object candidates as either a true object or a non-object using the measured geodesic distances by assuming that distinct object candidates in close proximity, along the rough indication of anatomical structure, exhibit common features; and
      classifying each of the object candidates as either a true object or a non-object using multiple instance learning and the determined set of features.

* * * * *